US005798624A

United States Patent [19]
Wilke et al.

[11] Patent Number: 5,798,624
[45] Date of Patent: Aug. 25, 1998

[54] MOTOR CIRCUIT

[75] Inventors: Robert A. Wilke; David P. Weichmann, both of Winona, Minn.

[73] Assignee: Lucas Industries, Reston, Va.

[21] Appl. No.: 808,817

[22] Filed: Feb. 28, 1997

[51] Int. Cl.⁶ .................. H02P 5/16; H02P 7/00; F02D 11/00
[52] U.S. Cl. .................. 318/254; 318/139; 318/439; 123/396; 123/399
[58] Field of Search .................. 318/138, 139, 318/245, 254, 430–439, 599; 123/399, 342, 396; 388/811, 812

[56] References Cited

U.S. PATENT DOCUMENTS

| | | | |
|---|---|---|---|
| 4,728,869 | 3/1988 | Johnson et al. | 318/335 |
| 5,020,125 | 5/1991 | Losic et al. | 388/811 |
| 5,051,670 | 9/1991 | De Piola | 318/434 |
| 5,063,740 | 11/1991 | Aihara | 60/432 |
| 5,132,602 | 7/1992 | Jorgensen et al. | 318/608 |
| 5,163,402 | 11/1992 | Taguchi et al. | 123/396 |
| 5,199,401 | 4/1993 | O'Neil et al. | 123/342 |
| 5,333,584 | 8/1994 | Kamio et al. | 123/399 |
| 5,386,185 | 1/1995 | Beck et al. | 318/762 |
| 5,463,298 | 10/1995 | Kamio et al. | 318/599 |
| 5,519,295 | 5/1996 | Jatnieks | 318/453 |

*Primary Examiner*—Paul Ip

[57] ABSTRACT

A motor control circuit for a d.c. commutator-type motor includes a semi-conductor driver circuit with a current sensor which provides an output voltage signal representing the instantaneous current in the motor. A detector circuit analyses the output signal of the sensor to provide pulses indicating the motor shaft position. The detector circuit includes a level-shifting, scaling and filtering circuit which substantially removes frequency components below a predetermined level and a pulse generator driven by the level shifting, scaling and filtering circuit.

10 Claims, 3 Drawing Sheets

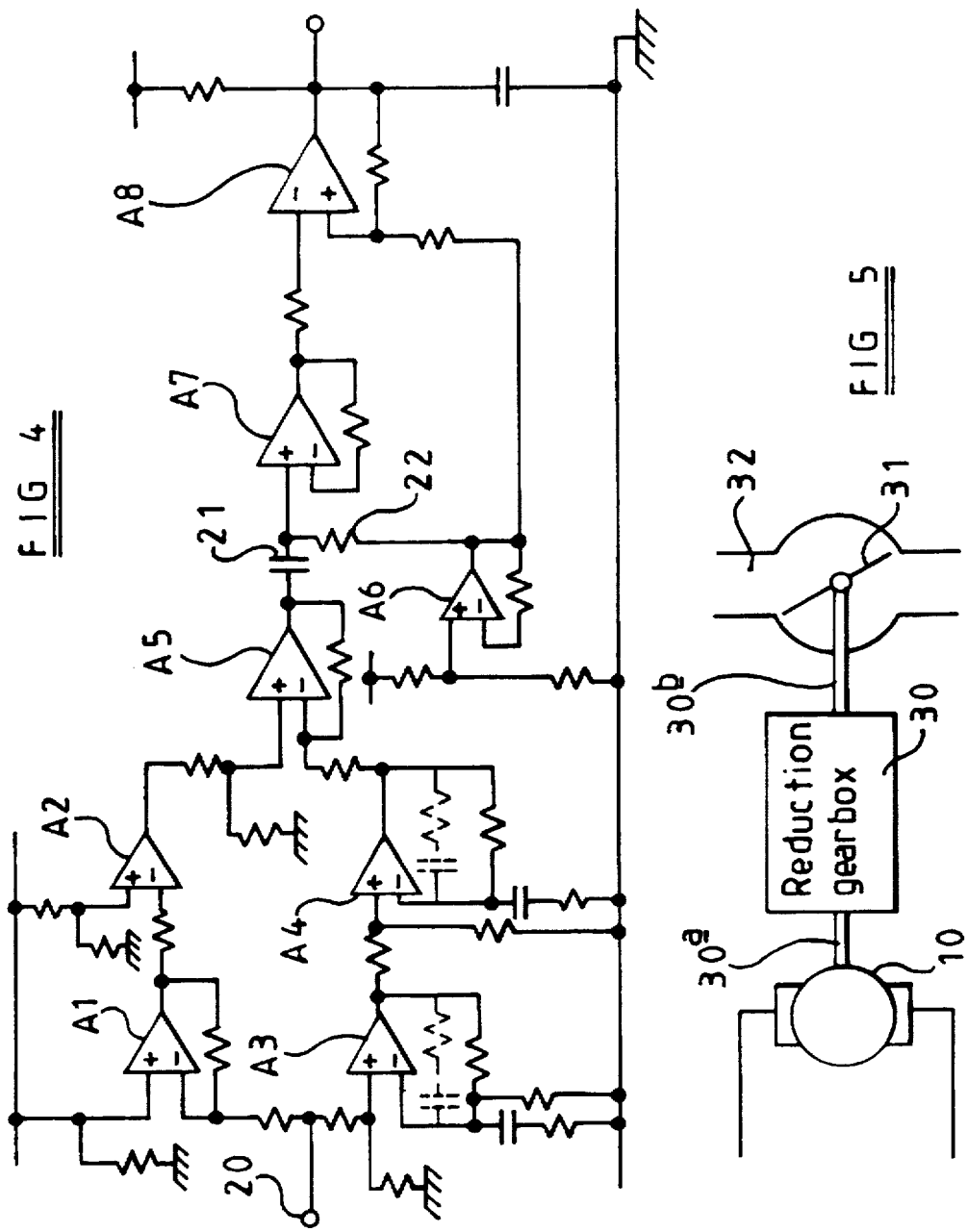

5,798,624

1
MOTOR CIRCUIT

BACKGROUND OF THE INVENTION

This invention relates to a motor control circuit in which there is means for providing an indication of the angular position of the output shaft of a commutator type DC electric motor.

One application for such a motor is in the control and positioning mechanism of a fluid flow control valve in particular a flap in an air conditioning unit for a vehicle. In this instance the flap controls the flow of air along a duct. Modern vehicle air conditioning units are microprocessor controlled and for satisfactory operation it is necessary to be able to position the flap at a predetermined position. In order to check that the flap has assumed the desired position after a signalled change of position it is known to utilize a sensor. In the practical arrangement the output shaft of the motor is coupled to or forms the input shaft of a reduction gear box the output shaft of which is coupled to the flap through a linkage. Whilst it would be possible to mount the sensor on the axle of the flap in practice the sensor is mounted on the output shaft of the gear box and the sensor comprises a simple potentiometer having a slider movable over a resistive track. Such a sensor requires three electrical connections so that for the complete installation five electrical connections are required. The provision of the sensor adds to the cost and bulk of the motor and gear box assembly besides the need to provide additional electrical connections and the associated wiring. Moreover such sensors are not noted for their reliability over an extended period of use.

GB-A-2186377 describes a commutator type electric motor in which one segment of the commutator is electrically connected to the output shaft of the motor. This allows a signal to be obtained which represents the voltage variation experienced by that segment as the armature of the motor rotates. From this signal can be obtained a pulse train in which the number of pulses per revolution of the armature depends upon the number of commutator segments. In order to extract the signal the shaft is electrically connected to the motor casing which may have to be insulated from the associated support structure.

It is therefore necessary with the above described arrangement to modify the construction of the motor as compared with a standard motor and it may be necessary to provide a special mounting arrangement.

The motor as described in GB-A-2186377 could be used for positioning the flap in the air conditioning unit described above but additional electrical connections beyond the two power supply connections would be required as in the known arrangement.

Furthermore, it has already been proposed, for example in U.S. Pat. Nos. 5,132,602 and 4,463,426, to use a current transformer with its primary winding in series with the motor and to detect in the waveform obtained from the transformer secondary winding, pulses indicative of the position of the motor shaft.

The use of a current transformer or other d.c. blocking arrangement is considered to be disadvantageous as it compromises either d.c. transient response or low frequency detection performance. Moreover any additional circuit component connected in series with the motor will either reduce the torque/speed performance of the motor or require the detector circuit to be a.c. coupled.

Where the switching on and off of motor current is controlled by solid state switches it is possible to detect instantaneous motor current directly either by detecting the voltage across the armature terminals, the saturation voltage of the switches being dependent on the current flowing, or by including a current monitoring arrangement in the drive circuit. The former detection method gives a voltage which varies non-linearly with motor current, whereas the latter gives a voltage signal which varies linearly with motor current.

When motor current is detected directly by either of these methods and shaft position detection is based on transitions of the detection voltage through a predetermined threshold, it is found that the number of transitions per rotation varies in accordance with load. In the case of a d.c. motor with three commutator segments, there may be three pulses per revolution detected at very light loads, but six pulses per revolution at heavy loads. Over an intermediate load range there may be nine pulses per cycle. These varying rates of pulse output make it difficult to determine the shaft position.

It has been found that the current dependent voltage waveform contains three basic components. Firstly there is a first component which has a frequency of six cycles per shaft revolution. The amplitude of this decreases from a maximum at high load to a minimum at no load. A second component has a frequency of only three cycles per shaft revolution and its amplitude increases from a minimum at high load to a maximum at no load. Finally, there is a third component which is a d.c. transient signal which arises from the motor being started and stopped.

It has been found that the first signal component referred to above is rich in high order harmonics, whereas the second signal component is relatively smooth and lacking in high frequency harmonics.

SUMMARY OF THE INVENTION

The object of the present invention is to simplify the detection of the shaft position and this object is achieved by filtering out frequencies below an upper limit level, so that the effect of the second signal component referred to above is partially or completely eliminated.

Where substantially complete elimination of the second signal component is achieved, the first signal component will be dominant over the entire load range. Where only partial, but nonetheless satisfactory, elimination of the second signal component is achieved, there will be a part of the load range where two pulses per commutator segment are produced and a part where three pulses per segment are produced. It is a relatively simple matter for a digital processor to recognise the additional pulses in the latter case and ignore them when computing shaft position.

Accordingly, the present invention provides a commutator-type d.c. motor control circuit incorporating motor current detection means for deriving a voltage signal dependent on the instantaneous current flowing in the motor, an active d.c. cancelling and filter circuit to which said voltage signal is supplied as input, said d.c. cancelling and filter circuit providing an output signal attenuated at frequencies below an upper limit level and a pulse generator circuit driven by the output of said d.c. cancelling and filter circuit.

According to another aspect of the present invention there is provided an apparatus for actuating a fluid flow control valve comprising the combination of a control circuit as defined above with a commutator-type d.c. motor having an output shaft, a reduction gearbox having an input member connected to said motor output shaft and an output member connected to said fluid control valve, and signal processing means connected to said pulse generator circuit and operating to receive signals from said pulse generator circuit and provide an indication of the position of the valve

BRIEF DESCRIPTION OF THE DRAWINGS

In the accompanying drawings:

FIG. 4 is a circuit diagram of a detector circuit included in FIGS. 1 and 2; and FIG. 5 is a diagram showing the use of a motor with a control circuit as shown in FIG. 1 for actuating a flap valve in a vehicle air conditioning system.

DESCRIPTION OF THE PREFERRED EMBODIMENT

Figure 1:
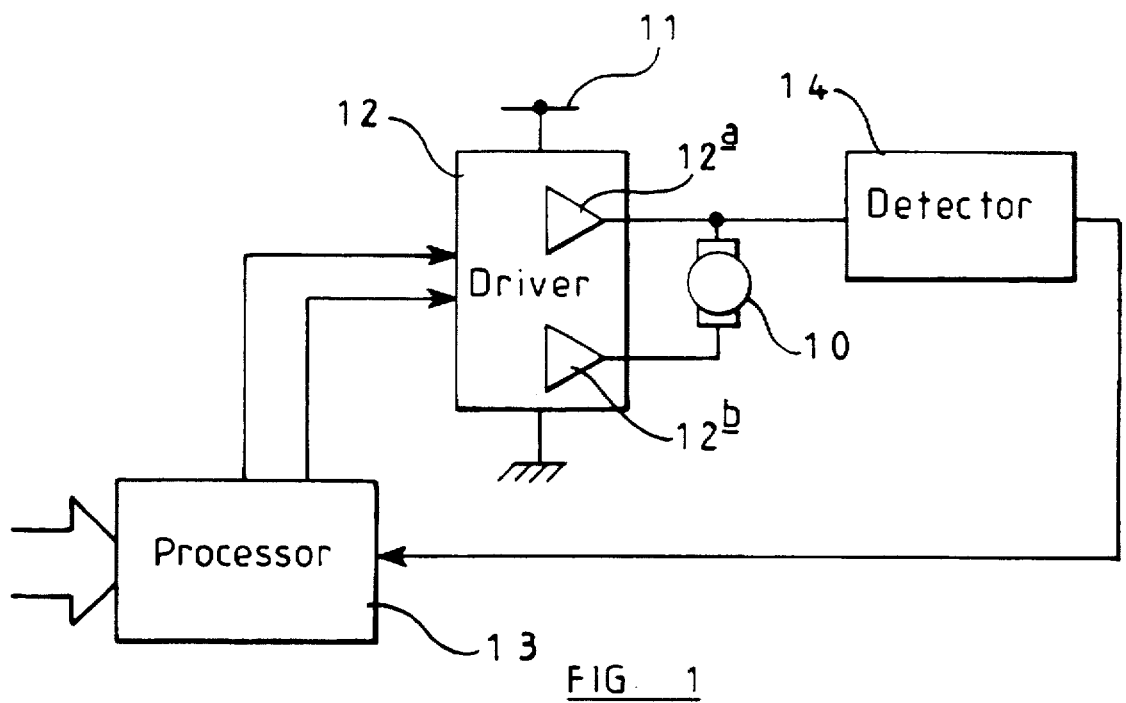
FIG. 1 is a block diagram of one example of a motor control circuit in accordance with the invention.

Referring firstly to FIG. 1, the motor 10 is connected to be driven from a power supply rail 11 by a solid-state driver circuit including a pair of push-pull output stages 12a and 12b so that the motor can be powered to run in either direction in accordance with signals received from a digital processor 13. Since the output stages include output transistors or field effect transistors each has an effective output impedance so that there will be a small voltage drop across each. This voltage drop is variable non-linearly with the motor current and hence, the voltage at either of the motor terminals will vary in accordance with the current flowing. Accordingly, one driver output stage can be used as a voltage detector providing a voltage signal which varies in accordance with the motor current. This voltage signal is applied to a detector circuit 14 which detects pulses in the voltage created by discontinuities in the current flow in the motor. The detector produces output pulses which are supplied to the processor 13 to provide data relating to displacement of the motor shaft.

Figure 2:
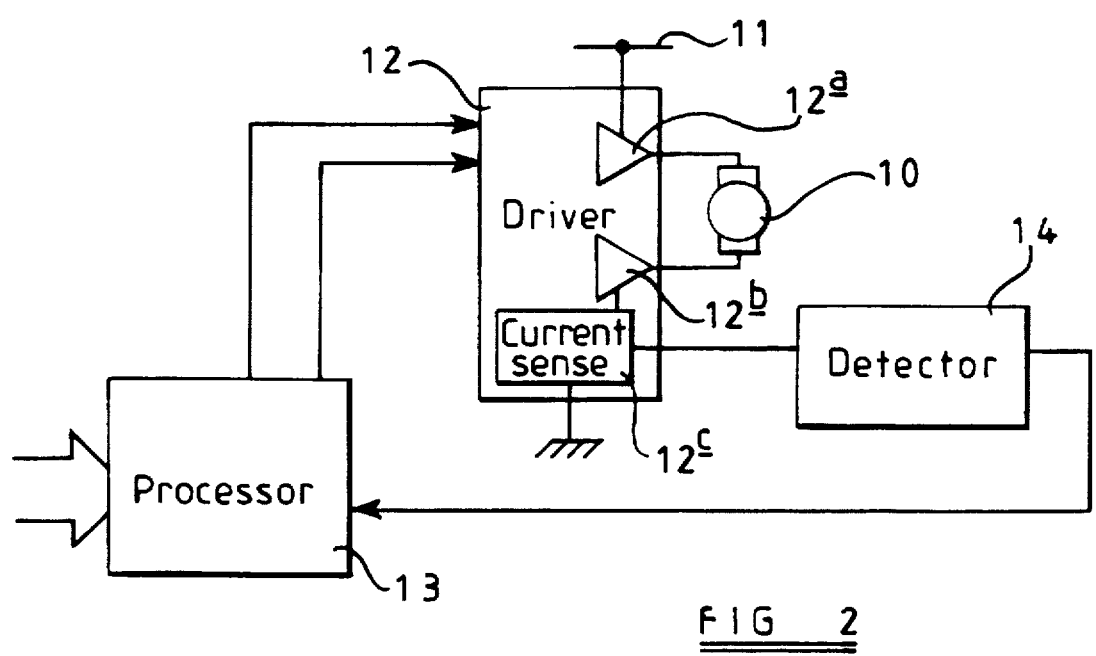
FIG. 2 is a block diagram of a modification of the arrangement shown in FIG. 1.

In the alternative arrangement shown in FIG. 2, the driver circuit has an independent output derived from a current monitoring circuit. Specifically, the output stage of the driver circuit makes use of HEXFET devices of known configuration in which each device includes a plurality of fet cells which share the load current between them and a sensor terminal connected to an isolated metalization region covering the source regions of a few selected ones of the cells. This arrangement enables the total combined drain current of the whole array of cells to be determined accurately and without any lag, in a substantially lossless manner. The voltage output at the sensor terminal is linearly related to the motor current.

Figure 3:
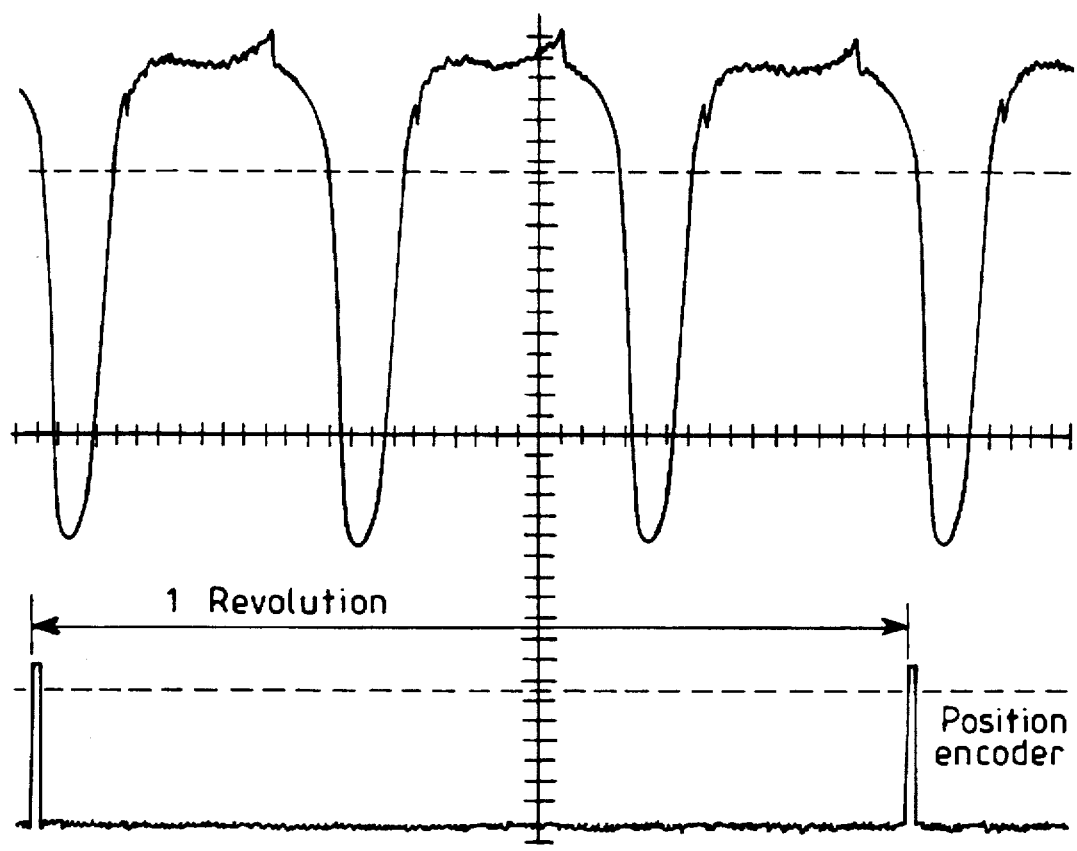
FIG. 3 is a oscillogram showing the output of motor current detection means included in either FIG. 1 or FIG. 2.

FIG. 3 shows the waveform of the voltage signal derived as shown in either of FIGS. 1 and 2. The waveform is that which applies when the motor is running at a relatively low load. It will be noted that there are three relatively deep troughs in the waveform during each revolution (the motor having two brushes and a three segment commutator). The depth of these troughs varies according to load. At high load the troughs are of very small amplitude, but at no load they are very deep. The crests of the waveform show two peaks each. The amplitude of the component of the waveform which creates these peaks is least at no load and greatest at full load. The trough waveform component is smooth and contains few high order harmonics. The twin-peaked waveform component, on the other hand, is rich in high order harmonics.

What is not shown in FIG. 3 is the shift of the overall d.c. level with load, which occurs transiently when the motor is started and stopped as a result of inertial loading.

The detector circuit shown in FIG. 4 includes an input terminal 20 directly d.c. coupled to the current dependent voltage signal terminal, be it the actual motor terminal as in FIG. 1 or the current mirror output terminal as in FIG. 2.

The signal at terminal 20 is split into two paths. One path includes a d.c. level shifter and scaler based on two operational amplifiers A1 and A2. The other path provides similar level shifting and scaling functions, but also acts as a two stage low pass filter (as described hereinafter). It is based on two operational amplifiers A3 and A4. The outputs from the two paths are combined by a difference amplifier A5 so that transient d.c. shifts in the input signal and frequencies below an upper limit level are cancelled. This upper limit level is selected so that the trough component of the waveform is removed leaving the upper harmonics of the double-peaked waveform component intact. The filter characteristics of the second path is obtained by providing unity gain up to a first zero frequency, followed by amplification above that zero frequency.

A capacitor 21 is used to connect the output of the amplifier A5 to the input of a buffer amplifier A7 and a resistor 22 connects the output of a reference level amplifier A6 to the same input of amplifier A7. A further amplifier or comparator A8 connected as a Schmitt trigger circuit receives the outputs of amplifiers A6 and A7 at its inputs and provides an output pulse for each peak in the twin peaked waveform component.

In use, the detector circuit provides position feedback to the processor 13 so that it can stop the motor when a desired position is reached. The motor control is particularly useful for use in motor vehicle processor controlled devices such as motorised mixing flaps in air conditioning systems, but many other uses are envisaged.

The embodiment described above makes use of a circuit acting as a low pass filter in the second path. It should be noted that where the additional components shown associated with amplifiers A3 and A4 are included, the filter will have a band stop characteristic which will give the overall scaling and filtering circuit a band pass characteristic. Removal of very high frequency noise helps eliminate spurious triggering of the trigger circuit by noise and interference pulses, which may occur because of the direct d.c. coupling of the detector circuit to the motor terminal.

The filter circuit shown in FIG. 4 has a fixed characteristic but it may have adjustable components variable under the control of the processor to raise and lower the filter cut off point according to motor speed.

However, it has been found that a fixed frequency cut off point set at about 12 times the maximum motor speed is adequate over a wide range of supply voltages and loads. For example a fixed filter with zero points at 1000 Hz and 500 KHz and poles at 20 KHz and 25 KHz has operated satisfactorily to detect the pulses at six pulses per revolution using a Mabuchi type RF370CM-11670 motor with supply voltages varying between 9 and 16 volts. The Schmitt trigger was set to require an input voltage change representing a motor current change of 26 mA.

Manufacturing tolerances may be such that, in some load/speed conditions, the effect of the trough component of the waveform is not entirely eliminated and nine pulses are sometimes produced in a revolution. The software of the processor 13 can readily be designed to ignore the three additional pulses which will occur between alternate pulses in the normal six pulse per revolution pulse train from the detector.

A simple voltage comparator or a voltage window detector of known configuration may be used instead of the Schmitt trigger circuit described above.

FIG. 5 shows the application of a motor which has a control circuit as described above in combination with a reduction gearbox 30 and a flap valve 31, 32 which is used as a flow control valve in a vehicle air conditioning system. The shaft of motor 10 is connected to the input member 30a of the gearbox and the output member 30b of the gearbox is connected to an angularly movable flap 31 in an air duct 32. The processor 13 of the control circuit is programmed to receive a flap position demand signal as a main control input. The processor receives pulses from the pulse generator circuit of the detector 14 and increments or decrements a position count according to the direction in which the motor is being driven. The position count is compared by the processor with the flap position demand signal and controls the supply of drive current to the motor in accordance with the difference.

In alternative embodiments of the invention, not shown in the drawings, the functions of the detector circuit shown in FIG. 4 may all be carried out by a digital signal processor programmed with appropriate software.

We claim:

1. A motor control arrangement comprising, in combination:

a dc permanent magnet motor having a motor commutator mounted on a motor shaft;

a motor driver circuit, a path between said driver circuit and said commutator for carrying a motor current having a waveform with peaks and troughs resulting from interruptions of said motor current by the motor commutator, said waveform including a trough component having a base frequency that corresponds to a rate at which the motor current is interrupted by the motor commutator and that is relatively free of any higher order harmonics of said base frequency, said waveform also having a twin-peaked component that includes relatively many of said higher order harmonics, said trough component having a depth that is greatest at low load conditions of said motor and said twin-peaked component having a height that is greatest at high load conditions of said motor;

a signal processing circuit coupled to said driver circuit and responsive to an input signal representative both of said trough component and of said twin-peaked component, said signal processing circuit providing an output from which all d.c. and low frequency components below a predetermined upper frequency limit have been substantially eliminated such that said output is derived only from said higher order harmonics and not from said base frequency; and a pulse generator circuit responsive to said output for providing a train of pulses indicative of an angular rotation of the motor shaft.

2. A motor control arrangement as claimed in claim 1, further comprising:

motor current detection means for deriving a voltage signal dependent on the instantaneous current flowing in the motor, wherein said voltage signal is representative both of said trough component and of said twin-peaked component, and said output signal is attenuated below an upper frequency limit level.

3. A motor control arrangement as claimed in claim 1, in which said signal processing circuit is an active d.c. level shifting, scaling and filtering circuit further comprising
   a first signal path providing a wide band output which is d.c. shifted and scaled
   a second path providing an output similarly d.c. shifted and scaled, but with high frequency components above said upper frequency limit amplified, and
   combining means for combining output signals from said two paths so as substantially to eliminate d.c. and low frequency components from the combined signal.

4. A motor control arrangement as claimed in as claimed in claim 3, in which said second path includes a two stage filter.

5. A motor control arrangement as claimed in as claimed in claim 1, in which said pulse generator comprises a Schmitt trigger circuit.

6. A motor control arrangement as claimed in claim 3, in which said driver circuit is a solid-state driver circuit having a motor terminal for providing said motor current; and said input signal is a voltage signal at said motor terminal.

7. A motor control arrangement as claimed in claim 1, in which said voltage signal is linearly related to the current flowing through said motor terminal.

8. An apparatus for actuating a motor control arrangement in claim 1 in combination with a fluid control valve, in which said motor further comprises
   a motor shaft, and
   a reduction gearbox having an input member connected to said motor shaft and an output member connected to said valve; and said train of pulses provides an indication of the position of the valve.

9. A motor control and valve arrangement as claimed in claim 8 in which said signal processing circuit is an active d.c. level shifting, scaling and filtering circuit further comprising
   a first signal path providing a wide band output which is d.c. shifted and scaled,
   a second signal path providing an output similarly d.c. shifted and scaled, but with high frequency components above said upper frequency limit amplified, and
   combining means for combining output signals from said two paths so as substantially to eliminate d.c. and low frequency components from the combined signal.

10. A motor control arrangement as claimed in claim 1, in which said driver circuit is an integrated solid state driver circuit; and said path between the driver circuit and the motor commutator is a low loss path free of any discrete resistive or inductive components.

\* \* \* \* \*

UNITED STATES PATENT AND TRADEMARK OFFICE
CERTIFICATE OF CORRECTION

PATENT NO. : 5,798,624
DATED : August 25, 1998
INVENTOR(S) : Robert A. Wilke

It is certified that error appears in the above-identified patent and that said Letters Patent is hereby corrected as shown below:

Title page, item [75], inventors: The second inventot's last name is misspelled. Change from Weichmann to Wiechmann.

Signed and Sealed this

Ninth Day of February, 1999

Attest:

*Attesting Officer*

*Acting Commissioner of Patents and Trademarks*